(12) United States Patent
Witmer

(10) Patent No.: US 9,068,849 B2
(45) Date of Patent: Jun. 30, 2015

(54) METHOD AND SYSTEM FOR REDUCING SHAPE POINTS IN A GEOGRAPHIC DATA INFORMATION SYSTEM

(75) Inventor: James Alan Witmer, Lebanon, NH (US)

(73) Assignee: TomTom North America, Inc., Lebanon, NH (US)

(*) Notice: Subject to any disclaimer, the term of this patent is extended or adjusted under 35 U.S.C. 154(b) by 623 days.

(21) Appl. No.: 13/318,785

(22) PCT Filed: Dec. 31, 2009

(86) PCT No.: PCT/US2009/069890
§ 371 (c)(1),
(2), (4) Date: Jan. 17, 2012

(87) PCT Pub. No.: WO2010/129001
PCT Pub. Date: Nov. 11, 2010

(65) Prior Publication Data
US 2012/0121206 A1    May 17, 2012

Related U.S. Application Data

(60) Provisional application No. 61/215,238, filed on May 4, 2009.

(51) Int. Cl.
*G06K 9/36* (2006.01)
*G01C 21/32* (2006.01)
*G06F 17/30* (2006.01)
*G09B 29/10* (2006.01)

(52) U.S. Cl.
CPC .......... *G01C 21/32* (2013.01); *G06F 17/30241* (2013.01); *G09B 29/102* (2013.01)

(58) Field of Classification Search
None
See application file for complete search history.

(56) References Cited

U.S. PATENT DOCUMENTS

| | | | |
|---|---|---|---|
| 5,731,820 A * | 3/1998 | Broekhuijsen | 345/442 |
| 5,774,133 A * | 6/1998 | Neave et al. | 345/505 |
| 6,366,851 B1 | 4/2002 | Chojnacki et al. | |
| 7,089,162 B2 | 8/2006 | Nagel | |

(Continued)

FOREIGN PATENT DOCUMENTS

| | | |
|---|---|---|
| DE | 10114412 C1 | 11/2002 |
| EP | 0421566 A2 * | 10/1991 |

(Continued)

OTHER PUBLICATIONS

Clothoidal interpolation—a new tool for high-speed continuous path control, CIRP Annals—Manufacturing Technology, 1988, vol./is 37.1, p. 25-28.*

(Continued)

*Primary Examiner* — Michelle Entezari

(57) ABSTRACT

Embodiments of the present invention provide a method of generating a shaped line in a geographic data information system, comprising selecting a first shaped line (100) in the geographic data information system, determining (205) a clothoid spline (300) representation of the shaped line, determining (210) a location of a first shape point corresponding to the clothoid spline (300) and determining (235) a location of a second shape point corresponding to the clothoid spline (300), wherein the location of the second shape point is determined (510) to be a maximum chord length from the first shape point within a predetermined tolerance.

17 Claims, 12 Drawing Sheets

(56) References Cited

U.S. PATENT DOCUMENTS

| | | | |
|---|---|---|---|
| 7,805,442 B1* | 9/2010 | Joshi et al. | 707/736 |
| 7,912,879 B2* | 3/2011 | Witmer | 707/831 |
| 2005/0004753 A1* | 1/2005 | Weiland et al. | 701/208 |
| 2005/0024361 A1* | 2/2005 | Ikeda et al. | 345/441 |
| 2005/0187705 A1* | 8/2005 | Niwa et al. | 701/208 |
| 2006/0100780 A1 | 5/2006 | Aleksic et al. | |
| 2006/0155464 A1* | 7/2006 | Smartt | 701/208 |

FOREIGN PATENT DOCUMENTS

| | | |
|---|---|---|
| WO | 9109375 | 6/1991 |
| WO | 2009071995 A2 | 6/2009 |

OTHER PUBLICATIONS

International Search Report issued Feb. 22, 2010 for International Application No. PCT/US2009/069890.

\* cited by examiner

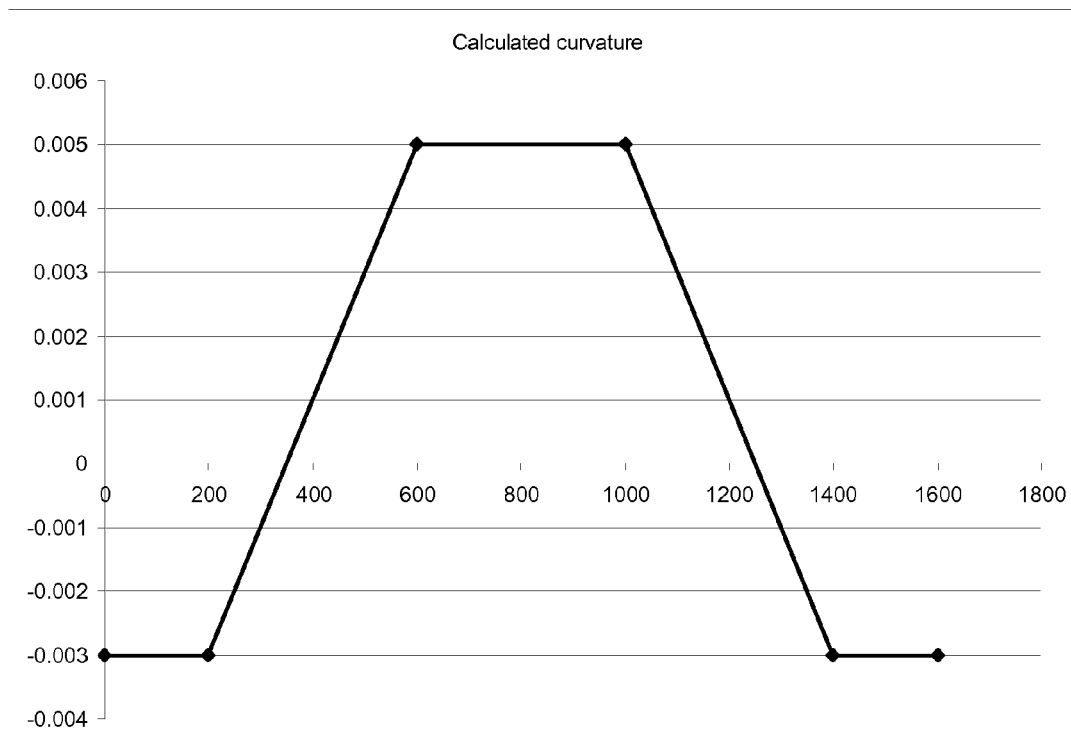

FIG. 4

```
1   Chain ParametricClothoid::toChain(double fidelity) const
2   {
3       Coordinate current_location = reference.front(),
4                  heading(reference.front_edge().unit_vector());
5       Chain result;
6       double error_remainder = fidelity;
7       result.push_back(reference.front());
8       map<double, double>::const_iterator leader = spline.begin(), follower = leader;
9
10      // for each section of the spline, we accrue points as needed for that section,
11      // and update the current location, current heading value, and update the
12      // error at the endpoint of that section.
13      for (++leader; leader != spline.end(); ++leader, ++follower)
14          AddClothoidSection (
15              result,                          // pass the chain to be filled
16              leader->first-follower->first,   // the length of the spline section
17              follower->second,                // the initial curvature
18              leader->second,                  // the ending curvature
19              current_location,                // the start location
20              heading,                         // the start orientation
21              fidelity,                        // level of fidelity to adhere to
22              error_remainder);                // and fill in the error remainder
23
24      // when done, we need to add the current location to the end of the built
25      // chain.  If the most recent placed point is very near the end of the spline
26      // (as indicated by having a large amount of error remaining), simply adjust it
27      // to the endpoint.  Otherwise push a new Coordinate to be the endpoint.
28      if (error_remainder > precision*0.9 && retval.size() > 1)
29          result.back() = current;
30      else
31          result.push_back(current);
32      return result;
```

FIG. 5

```
1  void AddClothoidSection(Chain& data, double len, double from, double to, Coordinate& loc, 2
Coordinate& unit_vector, double tolerance, double& remainder)
3  {
4      if (from== 0 && to == 0)
5      {
6          loc += unit_vector*len; // advance the location forward - no curvature.
7          return;                 // note: no need to change remainder.
8      }
9      SlopeIntercept curve(SlopeIntercept::value_type(0, from),
10         SlopeIntercept::value_type(len, to));
11     double position = 0;
12     while(1)
13     {
14         double start_curve = curve [position];
15         // see how much of the remaining curve i may take in one shape
16         double increment =
17             ComputeMaximumLen (len-position, start_curve, to, remainder);
18         double end_curve = curve [position+increment];
19         AddSingleClothoidShape
20             (data, increment, start_curve, end_curve, loc, unit_vector);
21         position += increment;
22         if (position<len)
23             remainder = tolerance;
24         // at the end of the section, reduce "remainder" by the error metric.
25         // if remainder is very low, we allow the final point to ride and reset
26         // the remainder back to tolerance.
26         // in all other cases, just drop the final point.
27         else
28         {
29             double error = errorMetric(start_curve, end_curve, increment);
30             double consumed = tolerance - remainder + error;
31             remainder = tolerance+consumed - 2 * sqrt(consumed*tolerance);
32
33             if (remainder < tolerance/40)
34                 remainder = tolerance; // reset it and let last point ride.
35             else
36                 data.erase(data.end()-1);
37             break;
38         }
39
40     }
41 }
```

FIG. 6

```
1   void AddSingleClothoidShape(
2       Chain& data,
3       double len,
4       double from,
5       double to,
6       Coordinate& loc,
7       Coordinate& heading)
8   {
9       // heading change in radians is the integral of the clothoid
10      // function, which goes [from-to] over len meters.  Simple.
11      double curve_delta = (to+from)*len/2.0;
12
13      Coordinate unit_normal = (-heading.second, heading.first);
14
15      // For the effective curvature in point placement the starting curvature has double
16      // the weight of ending curvature.  That's because the offset from the path,
17      // the cosine term, is proportional to curvature, which you can represent from time
18      // zero to time 1 as ax+b.  Integrating it to get the positional offset yields
19      // ax²/2+bx.  Notice that the b term, the one indicating the curvature at time zero,
20      // has twice the weight as the a (to-from)/len value.
21      // This is our "effective" curvature for point placement in this interval.
22      double effective_delta = (from*2+to)*len/3.0;
23      Coordinate unit_delta =
24              heading * (sin(effective_delta)/effective_delta)
25              + unit_normal*((1.0-cos(effective_delta))/effective_delta);
26      loc += unit_delta* len;
27      data.push_back(loc);
28      // change heading.
29      heading = heading * cos(curve_delta) + unit_normal * sin(curve_delta);
```

FIG. 7

```
// return the error distance, given a clothoid of [from-to] curvature, over distance.
double errorMetric(double from, double to, double distance)
{
        if (from == 0 && to == 0) return 0;
        double effectiveCurvature = computeEffectiveCurvature (from, to);
        if (effectiveCurvature == 0) return 0;
        double effective_radius = 1.0 / effectiveCurvature;
        // now just do the math.  I'll save one multiplication by pre-dividing distance
        // by two, then reducing r^2-d^2 as (r-d)*(r+d)
        distance /= 2;
        if (distance > effective_radius) return DBL_MAX;
        return effective_radius -
                sqrt((effective_radius+distance)*(effective_radius-distance));
}
```

FIG. 8

```
// return the constant curvature value that would generate
// the same error as this [from-to] curved clothoid section
double computeEffectiveCurvature(double from, double to)
{
        if (from == to) return fabs(from);
        double curve_diff = from-to;
        return sqrt(from*to+curve_diff*curve_diff/3.0);
}
```

FIG. 9

```
1  inline double ComputeMaximumLen(double len, double from, double to, double tolerance)
2  {
3       double guess = permissibleLength(from, to, tolerance);
4       if (guess >= len) return len;
5       if (from == to)
6               return guess;
7       long iterCount = 0;
8       do
9       {
10              double new_stop = from+(to-from)*(guess/len);// truncated curve
11              double newguess = permissibleLength(from, new_stop, tolerance);
12              if (fabs(newguess-guess) < 0.01)
13              {
14                      return min(newguess, guess);
15              }
16              guess = (newguess+guess)/2;
17      } while (++iterCount < 12);
18      throw (NonConvergenceException());    // fallback.
19 }
```

FIG. 13

```
// Given a curvature range [from-to], return the maximum length of a line segment
// (chord) that could be drawn without diverging more than 'tolerance'
// from the clothoid.
double permissibleLength(double from, double to, double tolerance)
{
        double effectiveCurvature = computeEffectiveCurvature (from, to);
        if (effectiveCurvature == 0) return DBL_MAX;
        double effective_radius = 1.0 / effectiveCurvature;
        // this is 2*sqrt(2rh - h^^2) - with h as gen_tolerance
        return 2 * sqrt( gen_tolerance*2*effective_radius - tolerance*tolerance );
}
```

FIG. 14

METHOD AND SYSTEM FOR REDUCING SHAPE POINTS IN A GEOGRAPHIC DATA INFORMATION SYSTEM

This application is the National Stage of International Application No. PCT/US2009/069890, filed Dec. 31, 2009 and designating the United States. The entire contents of this application is incorporated herein by reference.

This application claims priority from U.S. Provisional Application No. 61/215,238, filed on May 4, 2009. The entire contents of this application is incorporated herein by reference.

The present invention relates to methods and systems for use digital map databases and systems using such databases, for example Geographic Information Systems (GIS), navigation systems or devices (portable navigation devices, navigation enabled computing devices e.g. PDAs, phones and the like), route calculation software and apparatus using such software. In particular, embodiments of the invention relate to methods and system associated with shape information representing linear features in map databases.

BACKGROUND

Map data stored in digital map databases frequently represents linear features, such as roads, train lines, boundaries (recreational, political, land), supply lines etc., as shaped lines. A shaped line 100 is defined by two or more shape points 110, 120, 130, 140, 150 connected by straight lines or chords, as shown in FIG. 1. The shape points 110, 120, 130, 140, 150 may have been derived from measurements made of the feature using, for example, GPS-based equipment. However, various problems have been identified with representations of linear features, particularly in map databases.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which:

FIG. 4 illustrates curvature values for clothoid sections of the clothoid spline;

FIGS. 5 to 9 illustrate sample code according to embodiments of the invention;

FIGS. 13 and 14 are sample code according to embodiments of the invention; and

DETAILED DESCRIPTION OF EMBODIMENTS OF THE INVENTION

Figure 1:
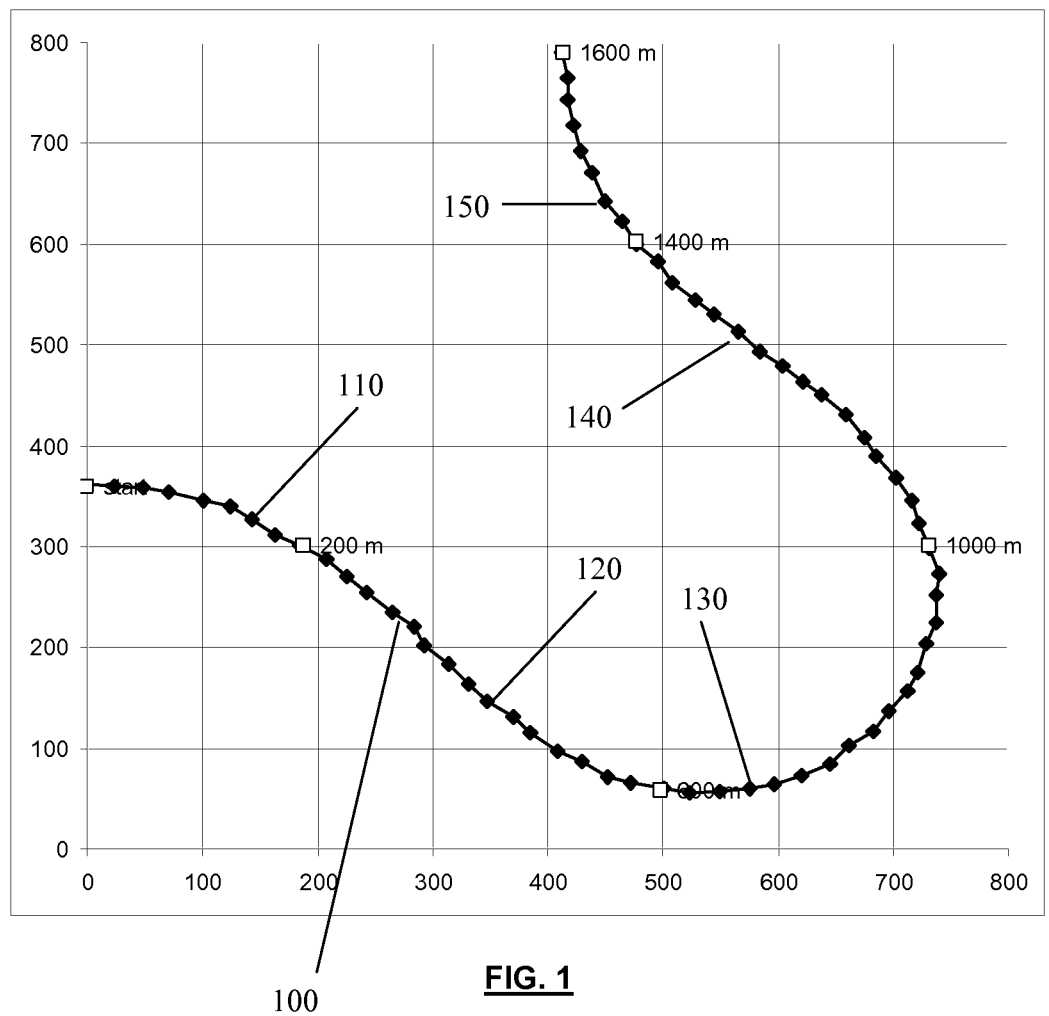
FIG. 1 illustrates an example shaped line derived from location measurements.

FIG. 1 is an illustration of a shaped line 100 following a path. The shaped line 100 shown in FIG. 1 is based upon location measurements determined, for example, by a GPS-based location measuring device. It will be realised however that embodiments of the invention may be applied to shaped lines from any source. For example, a shaped line may be produced by an operator, using a map editing tools, who places path points in order to generate roadway shapes according to aerial imagery or external maps. A shaped line may alternately be produced by a theoretical simulation of a process, such as a conflation process.

The example shaped line 100 shown in FIG. 1 includes 65 shape points 110, 120, 130, 140, 150 (only some of which have been referenced for clarity) having an error of ±5 m which are captured at 25 m intervals along the path of the shaped line 100. The shaped line 100 is shown overlying a grid, although this is merely for illustration and it will be realised that the origin point of the grid is of no particular relevance. Four points on the shaped line 100 are indicated with different coloured shape points at which a curvature of the shaped line changes. The points occur at travel distances 200 m, 600 m, 1000 m and 1400 m along the path of the shaped line 100. In this example, it is desired to determine a shaped line appropriate for a device, such as a navigation device, having a resolution of 2 m per pixel, thus the resultant shaped line be representative of the reference shaped line 100 to within 1 m and remain within ±2 m of the reference shaped line 100.

The shaped line 100 corresponds to measurement of a traffic ramp which exits an eastbound motorway, first curving rightward (southeasterly) as it diverges from traffic, for 200 meters, then (from 200 m to 600 m) gradually reversing the direction of curvature until it reaches a region of constant left-hand curvature from 600 m to 1000 m. From 1000 m to 1400 m the curvature changes gradually from left-hand to right hand, and from 1400 to 1600 the curvature remains constant until the ramp merges with northbound traffic. As captured, the measured data contains both jitter (error of individual readings), and the shape point capture rate of regular 25-meter intervals is more frequent than needed for example for a navigation device. Therefore, it is desired for a shaped line created by an embodiment of the invention to have fewer shape points, thus reducing a size of data representing the ramp.

Figure 2A:
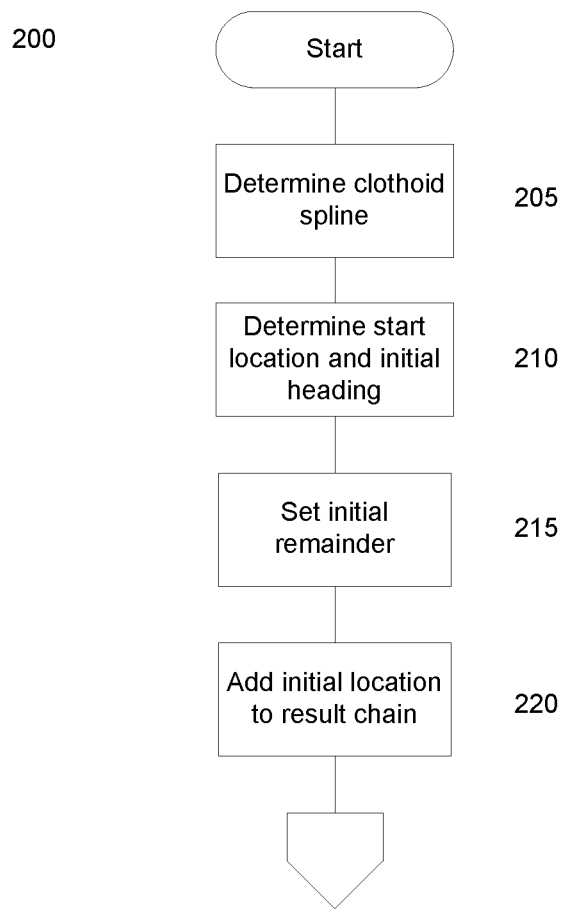
FIG. 2 illustrates a method according to an embodiment of the invention.
Figure 2B:
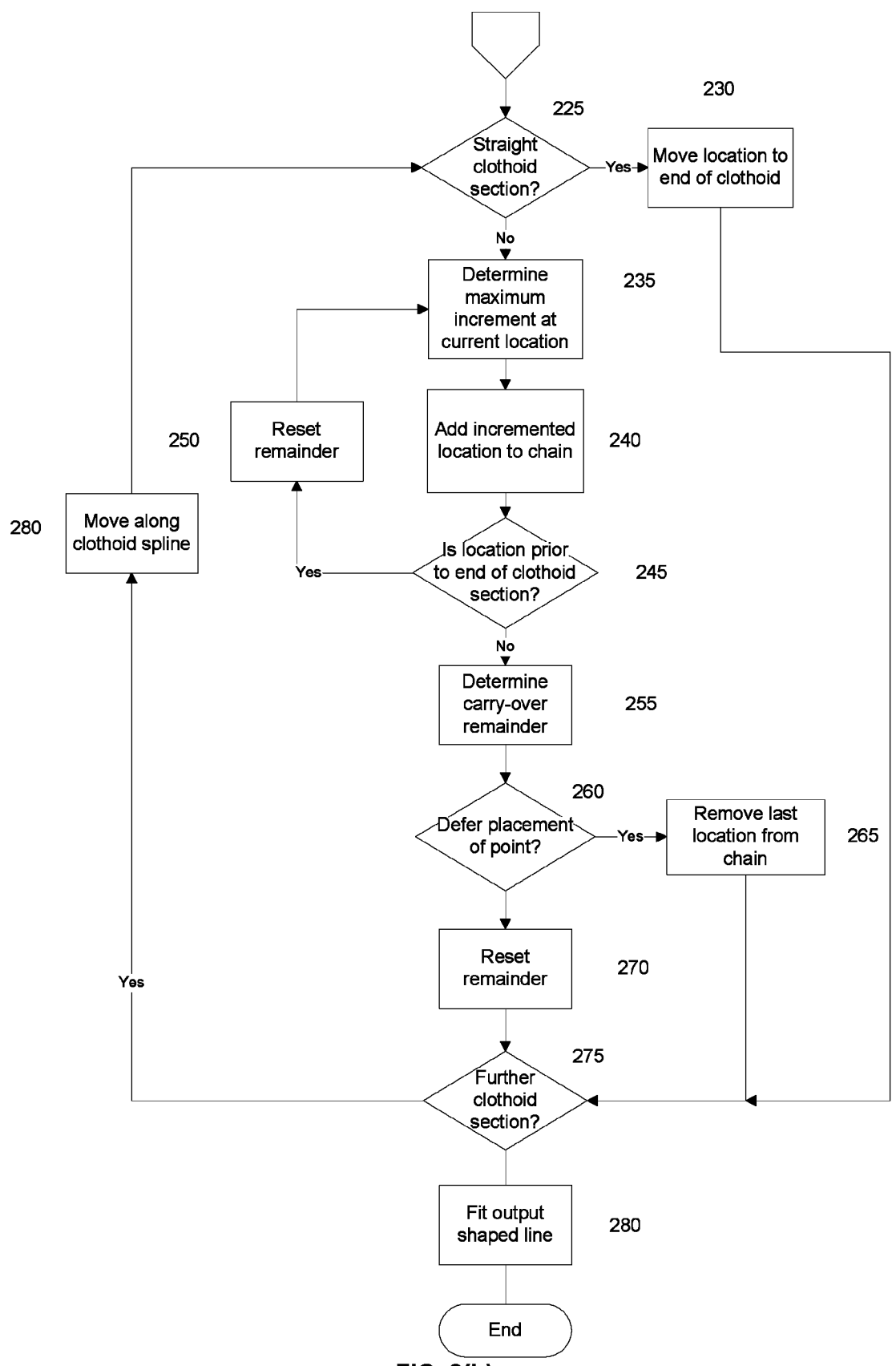

FIG. 2 illustrates a method 200 according to an embodiment of the invention. The method 200 generates a shaped line based upon the reference shaped line 100, wherein the generated shaped line includes a different number of shape points than the reference shaped line 100. As an intermediate step of the method 200, a clothoid spline is created which fits the path of the reference shaped line 100 within an accuracy threshold.

In step 205 of the method 200, a clothoid spline is determined which represents the shaped line 100 to within a predetermined accuracy threshold. The clothoid spline is a piecewise, continuous first order function of curvature versus travel distance along the path of the shaped line 100. Any clothoid representation of the shaped line 100 is not an exact equivalent to the shaped line 100, but rather an approximate characterization of the line. The choice of accuracy threshold used to generate the clothoid will dictate the level of fidelity to the original curve i.e. the ramp in the example of FIG. 1. When the accuracy threshold is chosen wisely, a clothoid may be produced which is truer to reality than the original shaped line 100. A method of generating the clothoid spline is explained in WO 2009/071995 by the present inventor, which is herein incorporated by reference.

Figure 3:
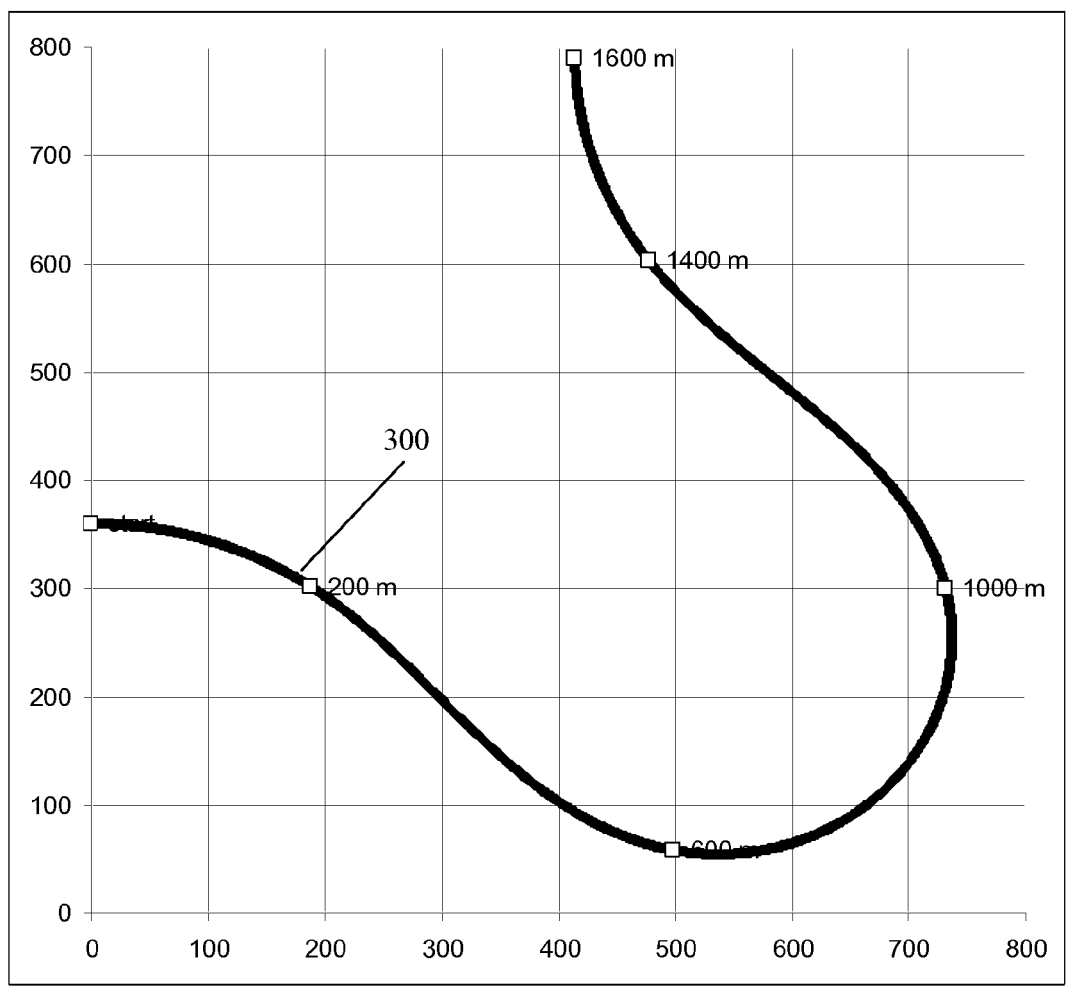
FIG. 3 illustrates a clothoid spline corresponding to the shaped line of FIG. 1.

A clothoid spline 300 determined in step 205 by the method disclosed in WO 2009/071995 is shown in FIG. 3. FIG. 4 illustrates calculated curvature values for the clothoid spline determined in step 205. As will be appreciated, between 0 and 200 m the clothoid spline has a constant curvature of −0.003 radians, between 200 m and 6 m the curvature various between −0.003 and 0.005 radians, whereupon between 600 m and 1000 m the curvature is constant at 0.005 radians. Between 1000 m and 1400 m the curvature decreases from 0.005 to −0.003 radians and is constant at −0.003 radians between 1400 m and 1600 m.

In order to determine the generated shaped line, embodiments of the present invention successively process each clothoid section of the clothoid spline generated in step 205. Shape points are determined which fit to each clothoid section within a given fidelity level. In some embodiments, to avoid unnecessary shape points, a remaining error level is carried over between adjacent clothoid sections, as will be explained.

In step 210 a start location and initial heading of a first section of the clothoid spline 300 are determined.

FIGS. 5 to 9 illustrate example code fragments which implement the method 200. The code shown in FIG. 5 refers to a class ParametricClothoid which holds curvature data for the clothoid spline, for example held in an association table. The class also has access to the original shaped line 100 data, which is represented as a class Chain which derives from the standard class Vector. The chain class can return edges (the line segments between successive shape points), which themselves are instances of a Line class. The example code generates a new Chain, result, by traversing the clothoid spline 300.

Step 210 is implemented by lines 3 and 4 of the sample code in FIG. 5. The generated chain, called result, is established at line 5. The location and heading will be used to determine shape points corresponding to the clothoid spline 300, as will be explained.

In step 215 a remaining error value is initially set to equal the fidelity value to which it is desired to fit the shape points to the clothoid spline 300. The fidelity value may be chosen appropriate for a desired application of the shaped line e.g. based on an accuracy of a device for which the shaped line is intended. The error_remainder variable is set-up at line 6 of FIG. 5. As will be explained, when processing a region of the shaped line 100 at which two clothoid spline sections join, the error remainder value may be carried over to from a preceding clothoid section to a following clothoid section and used in the determination of first shape point for the following section. The error remainder value is decremented as each section of the clothoid spline is processed whenever a shape point is determined to reside at any location other than an end of the spline section. Advantageously, this allows the generation of a shaped line having a minimum number of shape points. However, embodiments of the invention may be considered which place a shape point at an end of each spline section and reset the error remainder to the fidelity value.

In step 220 an initial or start location of the clothoid spline is determined to be a first shape point for the shaped line. At line 7 of FIG. 5 the coordinates of the first shape point are stored as a first shape point in the result chain.

In step 225 it is determined whether the current clothoid section under consideration is straight. This is accomplished in the sample code shown in FIG. 6 at lines 4-8 by considering whether a curvature of the clothoid section is 0 at both ends. If the clothoid section is straight then determination of a representation of such a clothoid section is simplified since it may easily represented by shape points. In step 230, if the clothoid section is straight then the current location is incremented by a length of the clothoid section in the direction of the initial heading determined in step 210, as at line 6 of FIG. 6. It will be noted from the sample code in FIG. 6 that the error remainder is not decremented in step 230 since the entire error remainder is available for use in a following clothoid section, should there be one.

In step 235, when the clothoid section is not straight, a maximum increment distance from the current location is determined according to the current error remainder value. The determination of the maximum increment distance will be explained later, with reference to FIGS. 12 to 14. However, in order to facilitate the determination of the maximum increment, a SlopeIntercept object called curve is established at lines 9 and 10 of FIG. 6. The SlopeIntercept object is a representation of a linear function in x,y coordinates. The SlopeIntercept object returns the function's y value for any given x value. The SlopeIntercept class is initially constructed from two points deemed as x, y values of a linear function—the constructor calculates slope and intercept of such a function. In this case, the function it represents is the linear function of curvature (y) per distance traveled (x). Thereafter, the SlopeIntercept object curve can be queried for the curvature at any given travel distance along the clothoid section. A variable called position is established at line 11 to store a current position along the current clothoid section and is initially set to 0 i.e. the start of the clothoid section.

In step 240, the location of the incremented position i.e. the current location plus the maximum increment distance determined in step 235 is then added to the result chain as a location of a shape point. Sample code for adding a shape point is shown in FIG. 7. In the sample code, a heading change between the current location and the incremented location is determined at lines 9 & 10. The change in heading is determined as an average curvature multiplied by the distance over which the curvature applies. For convenience, line 13 calculates a unit_normal, the left-hand normal vector to the heading. Next, a different curvature value is calculated (line 22) for purposes of positioning the point. As indicated in the comment at lines 15-21 of FIG. 7, this is based on the fact that the point will be offset more heavily by the curvature value at the beginning of the interval of time, than by the curvature at the end. Line 23 calculates an average unit change in position over the interval, and line 26 adds this vector, times the length, to the position (loc). The location is added to the result chain at line 27. Finally, the heading is updated at line 29.

In step 245, with reference to lines 22 and 23 of FIG. 6, it is determined whether the location added to the result chain is within the current clothoid section. If the location is still within the current clothoid section, then the remainder value is reset to the fidelity value and the method returns to step 235 to continue adding shape points to the chain representing the current clothoid section. In the sample code shown in FIG. 6, the variable position is incremented by the previously determined increment distance to move it along the clothoid section and this is compared against the length of the clothoid section at line 22. If the position is less than the length of the clothoid section, the remainder is reset to the fidelity value in step 250. Steps 235-240 are then repeated as necessary to reach the end of the current clothoid section.

In step 255, once it has been determined that the position has reached the end of the clothoid section, a remainder to be carried over to a following clothoid section is determined. Step 255 is implemented in the sample code by lines 27 to 38 shown in FIG. 6. Firstly, an error value is determined which represents the error in placing the last shape point. In the sample code this is determined using the function errorMetric( ), sample code for which is shown in FIG. 8, in combination with the function computeEffectiveCurvature( ), sample code for which is shown in FIG. 9.

Firstly, the errorMetric function determines whether the clothoid section is straight and, if so, returns an error of 0 indicating that the shape point has been placed without error. However, if the clothoid is not straight, then an effective curvature is determined based upon an initial curvature $c_i$ and a final or end curvature $c_f$ of the clothoid section using Equation 1.

$$e_f = c_i \times c_f + \frac{(c_f - c_i)^2}{3} \qquad \text{Equation 1}$$

Lines 30 and 31 of FIG. 6 then determine the error remainder for placing a next shape point. In one embodiment of the invention, the sample code on lines 30 and 31 of FIG. 6 provide a means to skip placement of a shape point near the end of a clothoid section if the placement of a subsequent shape point would suffice. The preferred embodiment approximates the remaining error that can be used in advancing a subsequent point; this approximation uses the first two terms of the Taylor expansion of the cosine curve, and as such, is very accurate where the curve radius is constant or near constant, and where the shape points are placed at small angles around the curve (the error of our approximation is less than 1% for angles totaling 10 degrees, and the approximation is conservative, causing shorter intervals than dictated by the error tolerance). Therefore the technique is valid and useful for rendering navigable roads in geographic views. Using the Taylor expansion of cosine for small angles, we can show that the overall error value of a chord extending to the endpoints of a series of adjoining smaller chords ($c_1$, $c_2$, $c_3$, $c_4$ ..., with errors $e_1$, $e_2$, $e_3$, $e_4$ ...) can be approximated as $\sqrt{e_{total}} = \sqrt{e_1} + \sqrt{e_2} + \sqrt{e_3} + \sqrt{e_4}$ .... In the simplest case where we've incurred error e1 with a permitted tolerance of t, we see from the equation that $\sqrt{t} = \sqrt{e1} + \sqrt{remainder}$. Solving for the remainder value, we see $\sqrt{remainder} = \sqrt{t} - \sqrt{e_1}$, and squaring both sides yields remainder$=t+e_1-2\sqrt{(e_1 t)}$, as indicated in the sample code on line 31 of FIG. 6.

In step 260, it is determined whether to defer placement of a point at an end of the current clothoid section. Step 260 is implemented by lines 33 to 37 of FIG. 6. The determination is based upon a relationship between the remainder value and the fidelity value. In some embodiments, it is determined whether to remove the last point if the remainder is less than a predetermined percentage of the fidelity value which, in one embodiment, is the fidelity value divided by 40, although other values may be used. If the remainder is less than the predetermined percentage of the fidelity value, then the remainder is reset to the fidelity value in step 270 and the last added shape point is retained in the result chain. However, if the remainder is more than the predetermined percentage, the last-added point to the result chain is removed at line 36 of the sample code in FIG. 6. The last-added shape point is removed because it is determined that sufficient error remainder may be used by moving the shape point to within the following clothoid section.

In step 275 it is determined whether a next clothoid section exists in the clothoid spline. This is achieved in the sample code by the "for" loop at line 13 of FIG. 5. The "for" loop continues until the end of the clothoid spline 300 is reached. If a following clothoid section exists, then in step 280 the current clothoid under consideration is moved along the clothoid spline to the following clothoid section. The method then returns to step 225 for processing of the following clothoid section and attribution of shape points to the result chain corresponding to the following clothoid section. However, if no further clothoid sections exist in the spline, the method moves to step 280, if necessary, as will be explained below.

Figure 10:
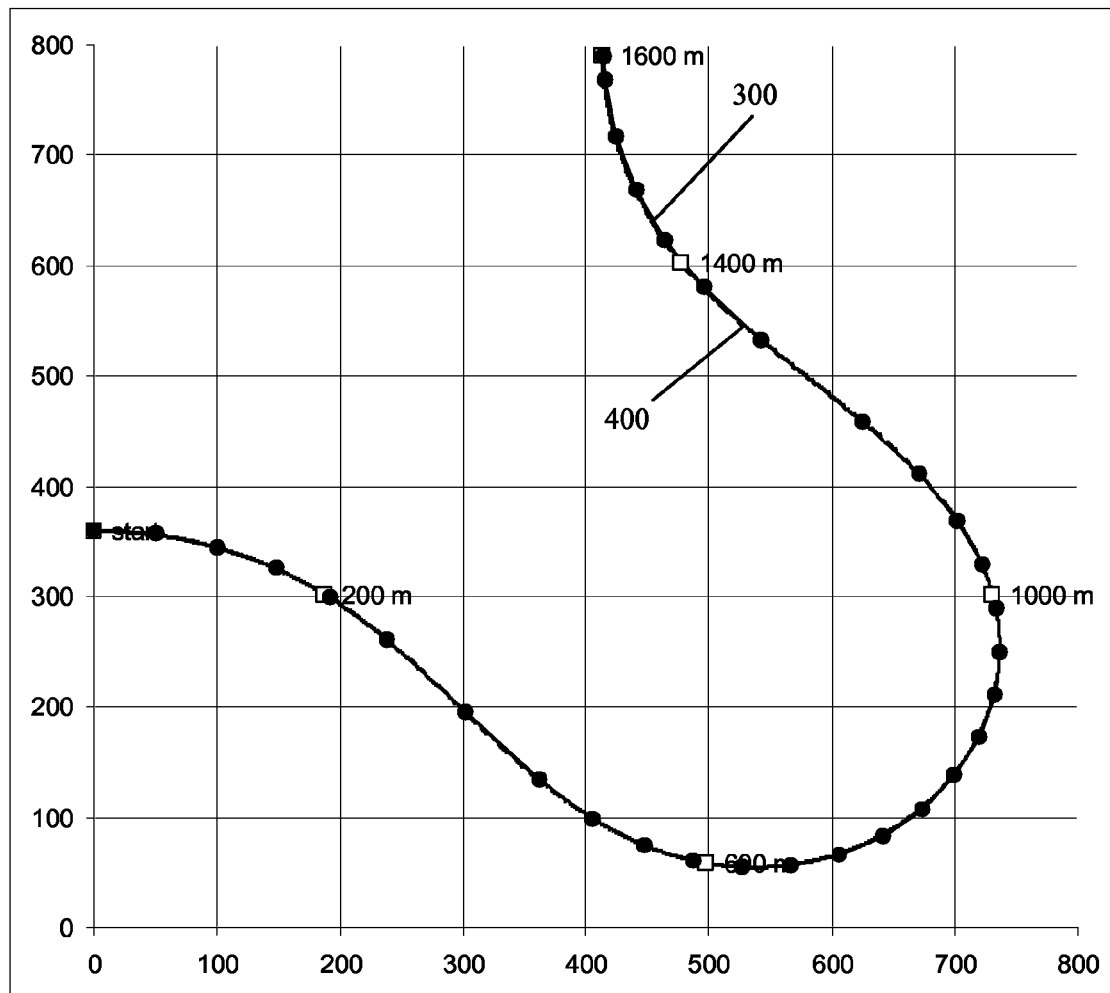
FIG. 10 illustrates a resultant shaped line produced by an embodiment of the invention.

Referring to FIG. 10, as a result of the method 200 illustrated in FIG. 2, a shaped line 400 is determined which corresponds to the original shaped line 100 to within the fidelity value. The shaped line 400 in FIG. 10 comprises 32 shape points, thereby reducing a data storage requirement for the shaped line 400. FIG. 10 shows the output shaped line 300 plotted against the intermediate clothoid spline 300 representation produced in step 250. At the zoom level of FIG. 10 the shaped line 100 appears almost indistinguishable to the clothoid spline 300.

Figure 11:
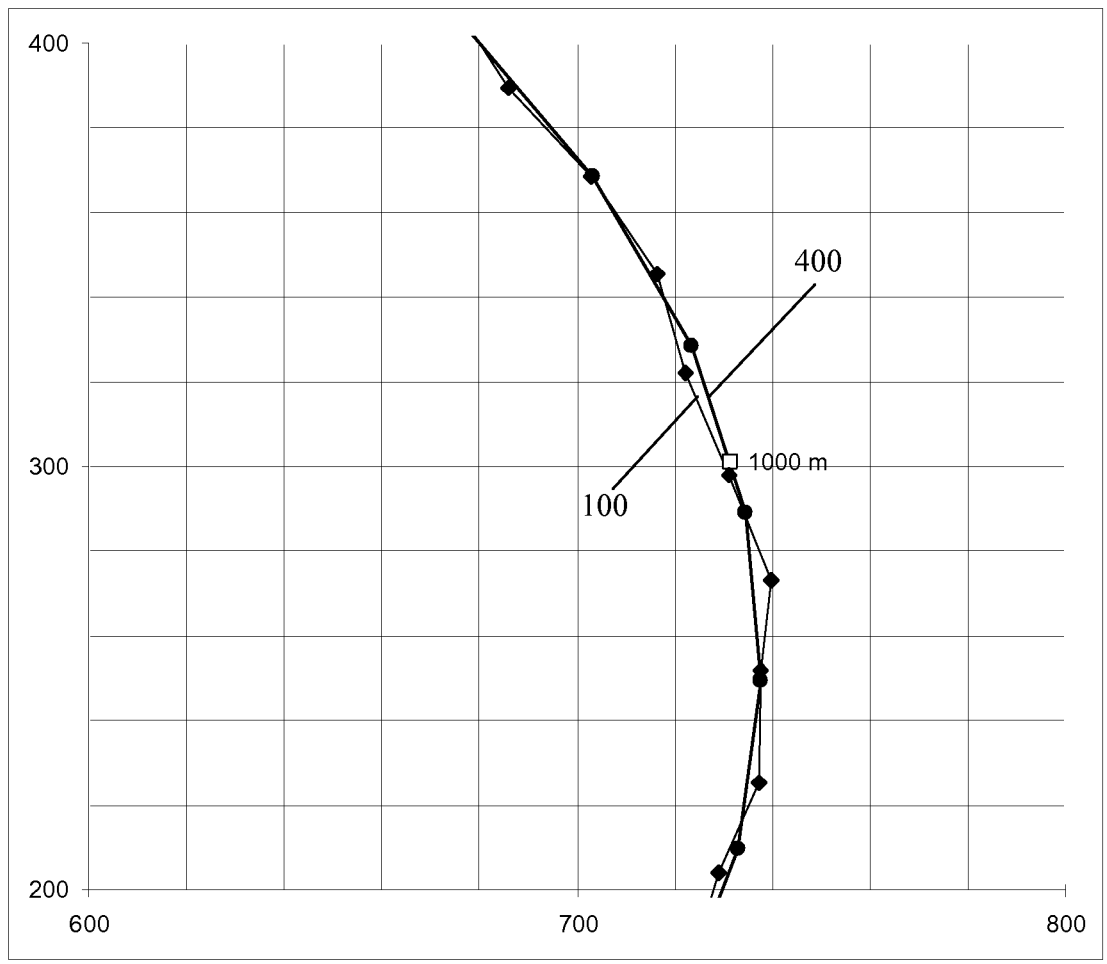
FIG. 11 is a close-up view of a portion of the resultant shaped line.

FIG. 11 shows a portion of the output shaped line 400 and original shaped line 100 in a closer view around 1000 m along the path. As can be appreciated, whilst the original shaped line 100 includes error, such as jitter, resulting from the measurement process for example, the output shaped line 400 is a much better representation of the linear geographical feature i.e. the ramp which it represents.

Figure 12:
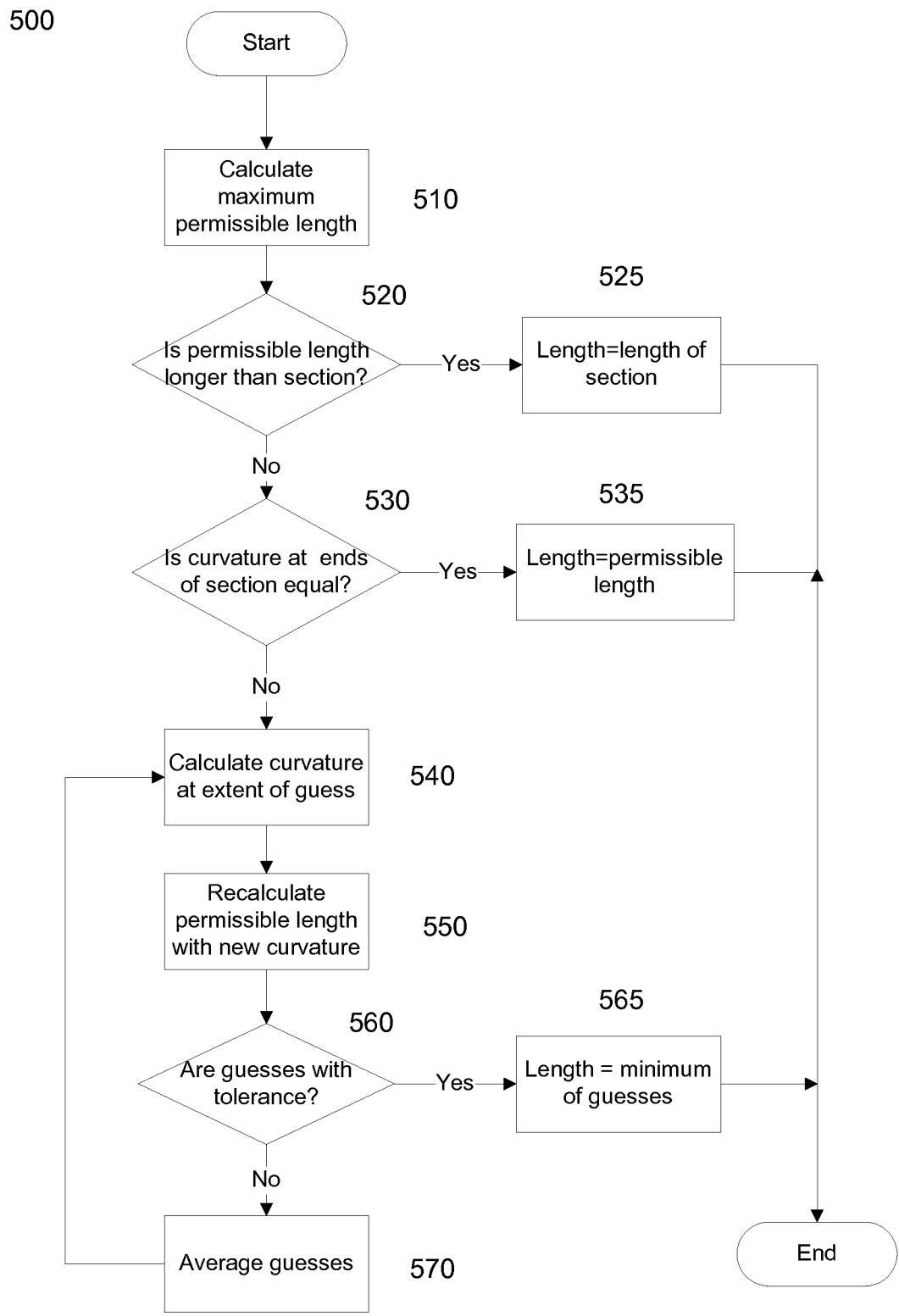
FIG. 12 is a method according to a further embodiment of the invention.

FIG. 12 illustrates a method 500 of determining a maximum increment for a shape point along a clothoid section according to an embodiment of the invention. The method 500 may be performed in step 235 of the method shown in FIG. 2. The method 500 illustrated in FIG. 12 may be implemented through a combination of the code shown in FIGS. 13 and 14, as will be explained.

In step 510 a maximum permissible length of chord or "step" is determined, given the current remainder or tolerance value. In the sample code shown in FIG. 13, the maximum permissible length is stored in a variable named guess at line 3.

In the case that the clothoid section being considered has a constant curvature, or rate of change of curvature of 0, then the length may be determined using Equation 2.

$$\text{Length}=2\sqrt{(r^2-(r-t)^2)} \qquad \text{Equation 2}$$

where t is the tolerance and r is the radius of the curve. This may be calculated per unit curvature c as shown in Equation 3.

$$\text{Length} = 2\sqrt{\left(\frac{2t}{c-t^2}\right)} \qquad \text{Equation 3}$$

Alternatively, the error e may be expressed as shown in Equation 4.

$$e=\sqrt{(r^2-(l-/2)^2)} \qquad \text{Equation 4}$$

The above-described calculations are implemented by the same code shown in FIG. 14.

When the curvature of the clothoid changes over travel distance (the distance along the clothoid), an effective curvature may be calculated, as previously described with reference to the sample code shown in FIG. 9. In this case, a combination of Equations 1-4 may be used to determine the maximum chord length or increment.

In step 520 of FIG. 12 it is determined whether the permissible length determined in step 510 is longer than or equal to a remaining length of the clothoid section being considered. This is implemented at line 4 of FIG. 13. If the permissible length is longer than the remaining clothoid length, then in step 525 the remaining length of the clothoid section is determined as the length of the chord.

If, however, the permissible length is not longer or equal to the remaining clothoid length, then in step 530 it is determined whether the curvature at both ends of the clothoid section are equal. If the curvatures are equal, then in step 535 the length of the chord is determined as the calculated permissible length. These steps are implemented by lines 5 and 6 of the code shown in FIG. 13.

However, if curvature values are not equal i.e. the curvature of the clothoid section changes along its length, then the length of the chord along the clothoid section must be determined. In embodiments of the invention the chord length is determined by successive approximation when the curvature of the clothoid changes. In step 540 a value of the curvature at an extent of a guess of the chord length is determined. In a first iteration of step 540, the first guess is the permissible length determined in step 510. This is implemented by line 10 of the code shown in FIG. 13. A new guess of the chord length is then determined in step 550 using the curvature value determined in step 540. It is expected that the new guess is closer to the actual possible chord length than the previous guess. This step is implemented by line 11 of the code shown in FIG. 13.

In step 560 the two guess values are compared and it is determined whether they are within a predetermined error range. This is implemented by line 12 of the code shown in FIG. 13 where an error range of 0.01 is used, although it will be realised that other error ranges may be used. If the guesses are within the error range, then in step 565 the length of the chord is determined as the minimum of the two guess values, although it will be realised that the maximum guess value may be selected or an average of the two guess values determined. This is implemented by line 14 of the code in FIG. 13.

However, if the guesses are not within the error range, then in step 570 an average of the two guess values is determined and the method returns to step 540 where the curvature at the average guess value is determined and steps 540 to 570 repeated as necessary. The averaging of the two guess values is determined by line 16 of the sample code shown in FIG. 13.

In order to prevent excessive repetitions of steps 540 to 570, a maximum number of possible repetitions may be set, as in line 17 of the sample code of FIG. 13, which prevents more than 12 repetitions being performed, although it will be realised that other limit values may be chosen. It has been found, however, that a chord length is often determined by approximately 4 repetitions of steps 540 to 570.

Returning to FIG. 2, as mentioned above, in step 280 the output shaped line 400 may be fitted to a network of which it is to form part of, if necessary. For example, the shaped line 400 may be part of a linear feature network, such as a road network, although it will be realised that other networks of linear features may be considered such as supply lines, boundaries etc. The shaped line 400, particularly at its end-points, may include a positional error in the location of the end points of the shaped line 400 and this positional error may lead to the end-points not matching precisely the locations of a network which the shaped line 400 is to form part.

In one embodiment, the end points of the shaped line 400 are moved to correspond to the locations of the end points of the network into which the shaped line 400 is to fit.

However, for some applications of embodiments of the present invention, movement of the end-points of the shaped line 400 may introduce undesirable side-effects, such as a change in travel direction along the shaped line 400 near the end-points. Therefore, in other embodiments, new locations for the end-points of the shaped line 400 may be calculated and an affine transform of the entire shaped line 400 be performed.

In still further embodiments of step 280, a translation of location of the start-point and end-point of the shaped line 400 is fitted into a linear function over travel distance or shaped line length. In the translation over the line length, the x and y offsets of the end-points are determined as a linear function of distance, and applied to the generated shape points. In some embodiments, particularly for shaped lines forming loops, the offsets may be determined as perpendicular and normal offsets, instead of x and y positions, as illustrated in FIG. 15.

Figure 15:
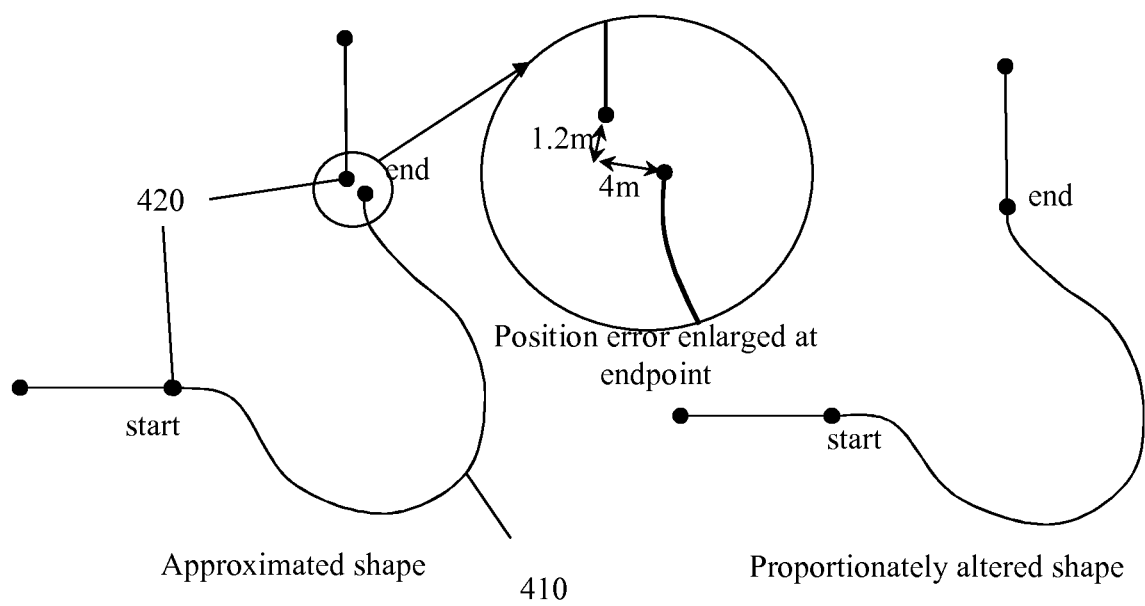
FIG. 15 is an illustration of proportional shaped line adjustment according to an embodiment of the invention.

FIG. 15 illustrates a shaped line 410 determined by an embodiment of the invention and end-points 420 of a network with which the shaped line 410 is intended to fit. As can be appreciated from the left-hand side of FIG. 15, a positional error exists between the end-point of the shaped line 410 and the network 420. The right-hand side of FIG. 15 the position of the shape points forming the shaped line 410 have been translated along the length of the shaped line 410. In the case illustrated in FIG. 15, the endpoint of the shaped line 410 misses the desired network node by 4 meters perpendicular to the direction of travel of the shaped line 410, and is 1.2 meters short along the direction of travel; the start point is already coincident with the desired start node of the network. Each shape point along the shaped line 410 may be adjusted by translating by the unit vector times 1.2*(travel-distance-to-point/overall-travel-distance) meters, plus the normal vector times 4.0*(travel-distance-to-point/overall-travel-distance) meters. In some embodiments, to use a minimum computing resource for adjustment, direct endpoint adjustment is used whenever it produces acceptable results, and each shape point is adjusted only if necessary.

A similar type of adjustment may be utilised to conform the shape of the output shaped line 400 to that of the original shaped line 100. The new shaped line 400 may fall outside of an acceptable distance from the original shaped line, particularly once it has been adjusted to meet network nodes, as described above. In an embodiment of step 280, when the shaped line 400 has been adjusted to meet network nodes, a location of shape points in the axis perpendicular to travel is adjusted. A perpendicular offset for the output shaped line is determined compared to original shaped line 100, as a function of travel distance. This can be performed only at each shape point on the output shaped line 400, or if greater inter-point accuracy is required, can also be determined using the points of the original shaped line 100. A recursive means of generating a piecewise linear, least-squared error function is then applied, as described in WO 2009/071995 for the generation of a curvature function. That is, an approximation to a perpendicular error function is determined as a single linear function; if the variance between this approximation and the actual error function exceeds a tolerance, the function is split in the travel axis at the point where actual error most diverges from the approximate error function; and this is repeated independently for the portion before and after the split point. Typical for recursive techniques, one or both sides may also need to be split further. After any two adjacent function pieces have been calculated, the travel length of each piece is used to determine a weight at the split point, so that we can arrive at a weighted average of the two least-squares functions which meet at that point. Once the piecewise perpendicular error function has been generated such that each piece approximates the actual error function within the specified tolerance, the resulting piecewise function may be used as a lookup table to adjust each shape of the calculated curve along its travel path perpendicular. The resulting shaped line 400 will follow the path of the original shaped line within the specified distance criterion.

Embodiments of the present invention provide a method and apparatus for producing a shaped line representing an original shaped line having a different number of shape points. Some embodiments may be used to reduce a number of shape points in the shaped line, thereby reducing data storage requirements for the shaped line. Furthermore, embodiments of the invention may produce shaped lines which more accurately represent geographic features. Embodiments of the invention reduce the number of shape points, particularly between adjoining clothoid sections in a clothoid spline representing the original shaped line.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating a shaped line in a geographic data information system, comprising:
    selecting a first shaped line in the geographic data information system;
    determining a clothoid spline representation of the shaped line;
    determining a location of a first shape point corresponding to the clothoid spline;
    determining a location of a second shape point corresponding to the clothoid spline, wherein the location of the second shape point is determined to be a maximum chord length from the first shape point within a predetermined tolerance,
    wherein, when the first shape point corresponds to a first clothoid section forming the clothoid spline and the second shape point is determined to extend beyond the end of the first clothoid section, the method includes determining whether to place the second shape point at an end of the first clothoid section according to a remainder of the tolerance, and
    wherein a determination of whether to defer placement of the second shape point at an end of the first clothoid section is based upon a relationship between the remainder and a fidelity value.

2. The method of claim 1, wherein if the remainder of the tolerance is greater than a predetermined level, carrying the remainder over to a second clothoid section of the clothoid spline to determine the location of the second shape point.

3. The method of claim 1, wherein the determining of the maximum chord length comprises determining a curvature of a clothoid section forming the clothoid spline.

4. The method of claim 3, wherein the determining of the curvature of the clothoid section comprises determining an effective curvature $e_f$ of the clothoid section according to:

$$e_f = c_i \times c_f + \frac{(c_f - c_i)^2}{3}$$

wherein $c_i$ and $c_f$ are curvatures of the clothoid section at first and second locations.

5. The method of claim 1, wherein the maximum chord length is determined according to:

$$\text{Length} = 2\sqrt{(r^2 - (r - t^2))}$$

wherein r is a radius of curvature of the clothoid section and t is indicative of the tolerance.

6. The method of claim 1, comprising determining a location of one or more further shape points corresponding to the clothoid spline, wherein each shape point is determined to be a maximum chord length from a preceding shape point within the predetermined tolerance.

7. The method of claim 1, wherein the first and second shape points form a second shaped line comprising fewer shape points than the first shaped line.

8. The method of claim 1, wherein the first shape point represents a start of the clothoid spline.

9. The method of claim 1, wherein the first shaped line represents a roadway geographic data information system.

10. A non-transitory computer program comprising computer executable code which, when executed on a computer, performs the method of claim 1.

11. A geographic data information system, comprising a data processor arranged to:
    determine a clothoid spline representing a first shaped line; and
    determine two or more shape points forming a second shaped line corresponding to the clothoid spline by:
        determining a location of a first shape point forming the second shaped line; and
        determining a location of a second shape point forming the second shaped line, wherein the location of the second shape point is determined to be a maximum chord length from the first shape point within a predetermined tolerance,
    wherein, when the first shape point corresponds to a first clothoid section forming the clothoid spline and the second shape point is determined to extend beyond the end of the first clothoid section, the method includes determining whether to place the second shape point at an end of the first clothoid section according to a remainder of the tolerance, and wherein a determination of whether to defer placement of the second shape point at an end of the first clothoid section is based upon a relationship between the remainder and a fidelity value.

12. The geographic data information system of claim 11, wherein if the remainder of the tolerance is greater than a predetermined level, carrying the remainder over to a second clothoid section to determine the location of the second shape point.

13. The geographic data information system of claim 11, wherein the maximum chord length is determined according to one of:

an effective curvature $e_f$ of the clothoid section determined by:

$$e_f = c_i \times c_f + \frac{(c_f - c_i)^2}{3}$$

wherein $c_i$ and $c_f$ are curvatures of the clothoid section at first and second locations; or the maximum chord length is determined by:

$$\text{Length} = 2\sqrt{(r^2 - (r-t^2))}$$

wherein r is a radius of curvature of the clothoid section and t is indicative of the tolerance.

14. The geographic data information system of claim 11, wherein the remainder is associated with an error level.

15. The geographic data information system of claim 14, wherein the remainder is set to the fidelity value associated with fit shaping for the clothoid spline.

16. The method of claim 1, wherein the remainder is associated with an error level.

17. The method of claim 16, wherein the remainder is set to the fidelity value associated with fit shaping for the clothoid spline.

* * * * *